Figure 1:
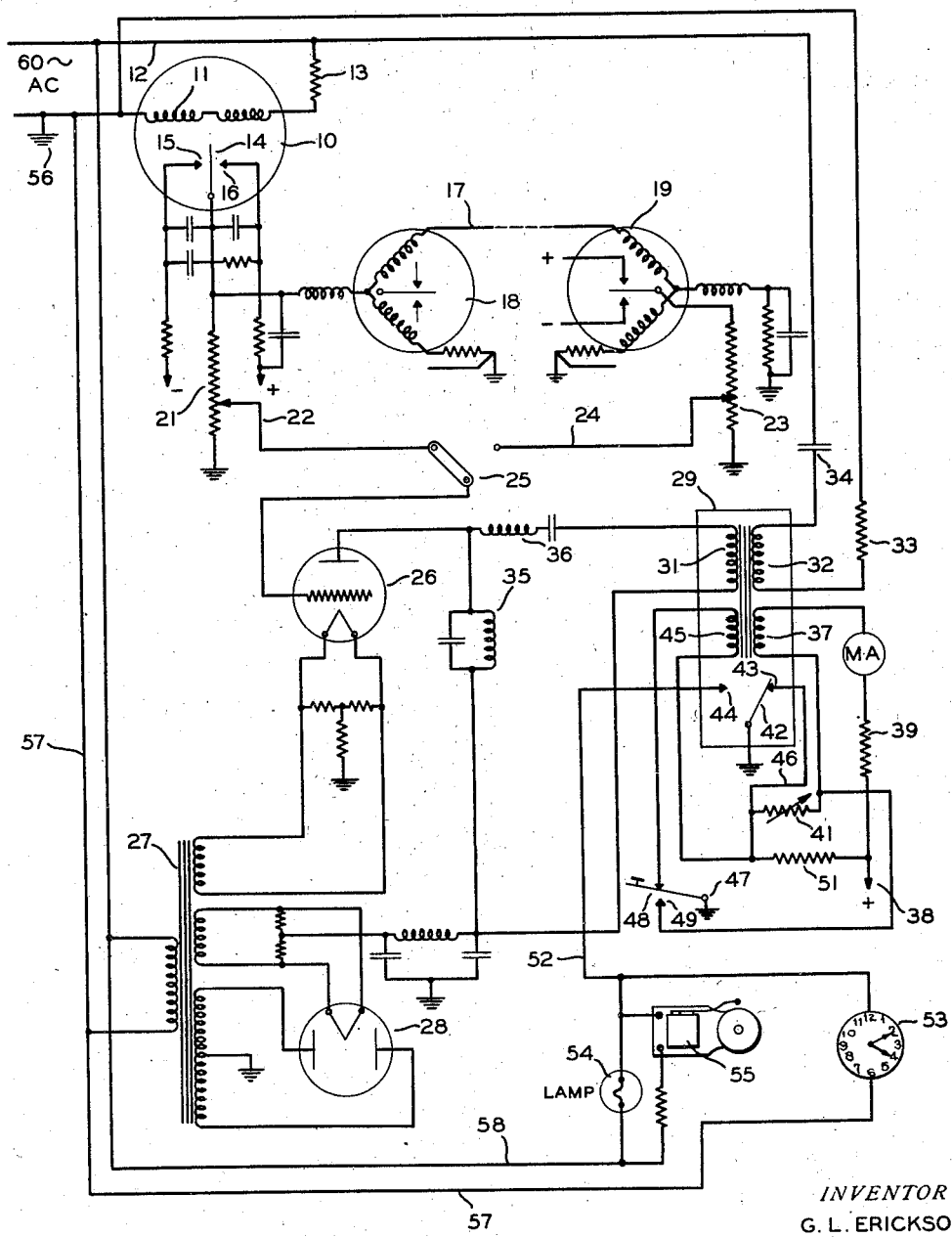

Feb. 26, 1935. G. L. ERICKSON 1,992,363
TESTING APPARATUS
Filed Dec. 15, 1932 2 Sheets-Sheet 2

INVENTOR
G. L. ERICKSON
BY Eugene Leo Brown
ATTORNEY

Patented Feb. 26, 1935

1,992,363

UNITED STATES PATENT OFFICE 1,992,363

TESTING APPARATUS.

George L. Erickson, Hasbrouck Heights, N. J., assignor to The Western Union Telegraph Company, New York, N. Y., a corporation of New York Application December 15, 1932, Serial No. 647,452

9 Claims. (Cl. 178—69)

This invention relates to methods and apparatus for making life or reliability tests of telegraph circuits and apparatus and it has for an object to provide means which is responsive to or "observes" every signal.

In the study of fortuitous distortion occurring in telegraph circuits and in the study of the life or reliability of certain types of telegraph apparatus, it is desirable to observe every signal reproduced by said circuit or apparatus or in other words, the entire signal train at one time instead of only part of the signals at a time such as one in ten or one in twenty as has been done heretofore.

Fortuitous distortion is a term applied to distortion which does not necessarily recur regularly but which results from a combination of circumstances arising at variable intervals, the combined effect of which influences the action of the circuit or apparatus in its response to signals being transmitted at the moment the circumstances arise. Fortuitous distortion may be due to extraneous disturbances or to conditions within the circuit or the apparatus or to a combination of both. Among the extraneous disturbances may be atmospheric effects or induction from other circuits or apparatus which, combine with the signal impressed upon the circuit to produce shortened, lengthened or even false received signals.

Distortion due to conditions within the circuit may be caused by time lag of the relay or contact apparatus employed. This may be due to a condition of the contacts, "travel time" required by the armature in passing from one contact to the other, electrical and mechanical bias or rebound of the contacts when they engage. All of these factors and others may combine to produce distortion in the circuit or apparatus and act to limit the speed with which the circuit may be effectively operated and more particularly the reliability of the circuit or apparatus for transmitting signals under actual conditions of operation.

Another object of my invention is to devise means for measuring this reliability or the life continuity of the apparatus being tested, or in other words, to record the length of time a circuit or apparatus operates effectively without failure under actual or test conditions.

Still another object of my invention is to provide an apparatus which will compare with the signal transmitted the signal received at any point including a part or all of the circuit or any particular portion of the apparatus included therein and by this means to determine whether distortion equal to or greater than a predetermined amount occurs.

A further object of this invention is to provide apparatus which may be employed for making life tests of apparatus under either actual or laboratory conditions and which will determine definitely when the first failure occurs in any of the signals received. A still further object is to record the absolute number of times distortion occurs and the average number of occurrences, thus determining absolute performance rather than an average performance or average efficiency of the circuit or apparatus.

Still another object of this invention is to adapt a circuit having a trigger-like action to test apparatus of this type so that response may be had to relatively high speed signals.

According to this invention, the apparatus may be devised to observe either the whole or solid signal or any point in the signal wave. According to the embodiment for observing the whole signal, the apparatus includes means for impressing the signal transmitted through the apparatus or over the line upon one winding of a comparison relay and the signal received or reproduced by the apparatus upon another winding of the comparison relay. The comparison relay is arranged to remain inactive so long as the comparative strength of the signals impressed upon the respective windings remain substantially equal or do not vary more than a certain predetermined amount or percent. For instance, a relay may be arranged to respond only to signals which vary from the standard by twenty-five percent or greater. Other relations may be provided for. When a variation occurs greater than the predetermined minimum the comparison relay responds to operate a signal recording apparatus. The recording apparatus may be arranged to indicate the length of time the circuit was in operation until the first distorted signal was received or it may indicate the number of distorted signals received during the test period or any other suitable indication.

According to another embodiment of this invention means comprising primarily synchronously driven distributors, one in the transmitting and one in the receiving end of the circuit are so arranged that an indication is given when the reproduced signals are out of phase or become displaced angularly from the original signals. The distributor in the reproduction end of the circuit which is devoted to observing the signal may include a relatively small sector and a brush arranged to be shifted with respect to the commutator carrying the original signal so as to observe any desired portion of the reproduced signal wave.

Figure 2:
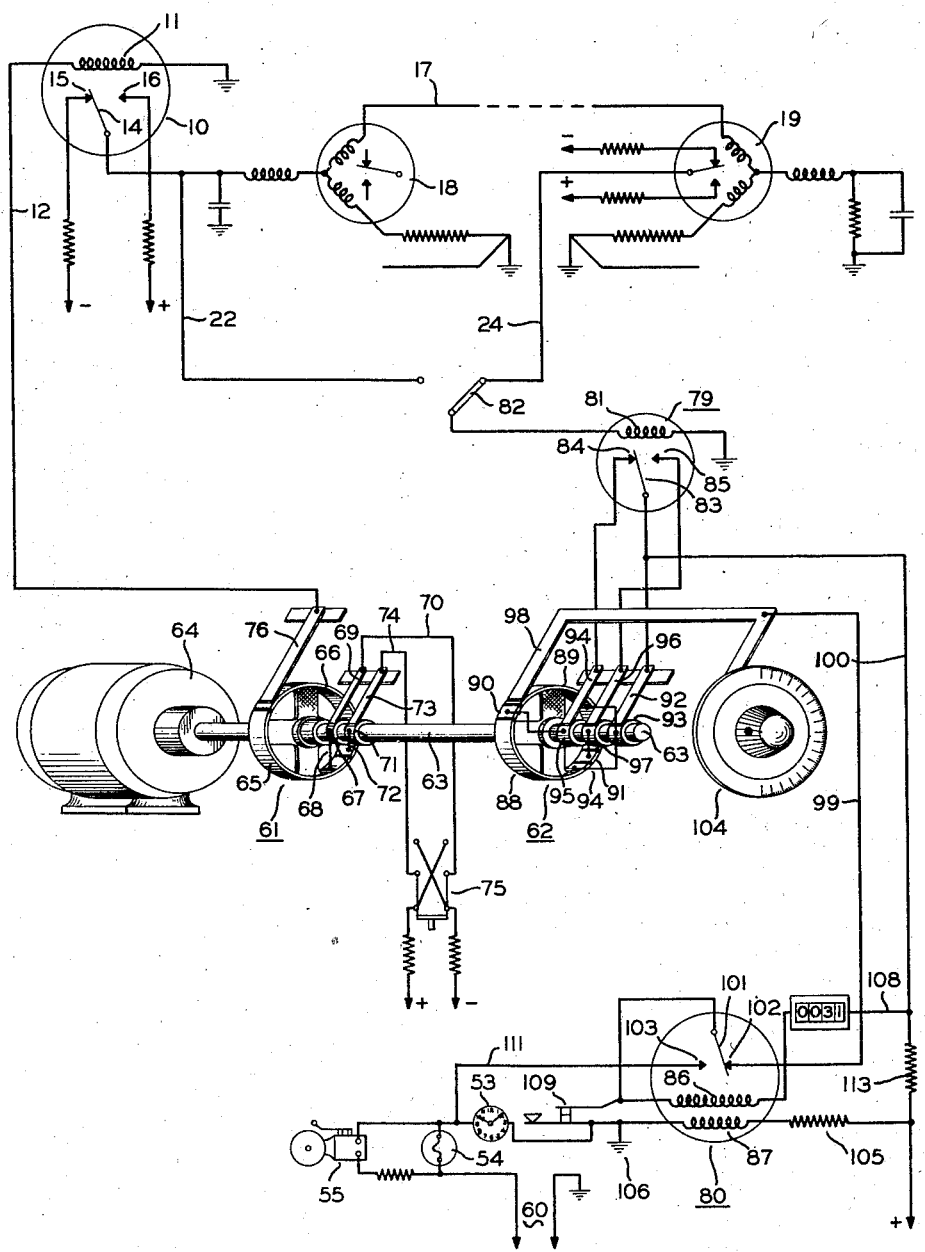

The exact operation of this invention will be apparent from the following description and claims taken in connection with the accompanying drawings in which Fig. 1 illustrates the embodiment for observing the whole signal and Fig. 2 the embodiment for observing any desired portion of the signal.

Referring to Fig. 1 of the drawings, the embodiment of the invention illustrated, provides for observing the whole signal and for rendering an indication when the signal varies a certain predetermined amount from the original signal. The arrangement comprises a relay 10 to be tested, which includes flux or actuating coils 11 energized from a signal circuit 12. The signal circuit may be arranged to impress any suitable signal desired upon the relay. For ordinary test purposes a signal of constant frequency such as a 60 cycle alternating current frequency obtained from ordinary commercial lighting circuits may be employed. When the relay 10 is connected directly into the commercial circuit, a current limiting resistor 13 will be placed in series with the relay to obtain a current therethrough within safe limits. The relay 10 reproduces the signal through its armature 14 which vibrates between contacts 15 and 16 which in turn are provided with plus and minus batteries respectively. The armature of the relay is connected into a line circuit 17. The line circuit 17 may be an ordinary commercial circuit or an artificial circuit set up for test purposes. Assuming that the test relay is operating in a duplex telegraph circuit, the circuit 17 will include a receiving relay 18 at the near end of the circuit and a second receiving relay 19 at the distant end of the circuit. These relays are provided with the usual winding connected in duplex balancing relation.

With the relay 10 connected into a circuit as described, actual operating conditions are present. In order to make a test of the reliability of the relay, current is bled from the armature circuit through a grounded high resistance 21. This resistance is tapped off through a suitable potentiometer arrangement and connected through wire 22 to the test apparatus. If it is desired to test the entire circuit to determine its life continuity, current may be bled from the armature of the receiving relay through a grounded high resistance 23. A potentiometer connected with this resistance conducts a suitable amount of current through wire 24 to the test apparatus. In order to arrange for testing either or both points of the apparatus a suitable switch 25 may be provided to connect either of the bleeder potentiometers to the test apparatus.

The test apparatus comprises in its preferred form a vacuum tube amplifier connected to a comparison relay which in turn operates a suitable signal or indicator device. The vacuum tube amplifier may comprise one or more tubes 26 arranged in a well known manner to amplify the current bled from the test apparatus. It is desirable to use an amplifier for this current so that it will be necessary to bleed only a very small fractional portion of the current from the test circuit. The amplifier may be supplied with suitable current potentials from a conventional power supply arrangement comprising a suitable transformer 27, for supplying current to the filament of the amplifying tubes and space current for the tubes through a well known rectifier arrangement employing tube 28.

The output of the amplifier is fed to a comparison relay 29 through a flux coil or winding 31. A similar winding 32 is connected with the signal source. When the source is a commercial 60 cycle circuit, the amount of current to the winding 32 may be limited by a filter arrangement comprising a suitable resistance 33, in one leg of the circuit and a blocking condenser 34 in the other leg. The output of the vacuum tube amplifier is passed through a suitable shifting or phase changing network such as devices 35 and 36, included in the circuit. The signal shifting network is essential to align the fluxes produced in the respective windings 31 and 32, so that they will substantially neutralize each other under conditions of normal operation. Ordinarily the shifting and amplification of the current fed to the windings is adjusted so that that due to the original signal is just balanced by that due to the reproduced signals when they are substantially equal to the normal input or original signal. When the circuit is in operation under the desired conditions, the resultant flux of these coils will be very low so long as the apparatus being tested properly reproduces the signals.

The comparison relay 29 is provided with a biasing winding 37 which produces a flux tending to hold the tongue of the relay against one of its contacts. The biasing flux is adjustable and is provided with current from a positive source through the lead 38 and blocking resistances 39 and 41 in circuit therewith. Either one or both of these resistances is adjustable to vary the amount of current traversing the circuit. The relay is provided with a grounded tongue or armature 42 which moves between opposite contacts 43 and 44. The flux from the bias winding 37 acts in such a direction as to tend to hold the tongue 42 against contact 43 in opposition to fluxes resulting from an unbalance of the currents in windings 31 and 32 occurring when the value of the reproduced signal pulses falls below normal. In this manner, only when an unbalance greater than a predetermined amount occurs will the holding effect of the bias winding be overcome and the tongue moved into engagement with the other contact. By adjusting the current through a winding 37, the relay may particularly when testing complete line be set to over-ride small disturbances and respond only to a certain degree unbalance representing a predetermined degree of failure in the strength of any of the reproduced signals.

When the tongue 42 has moved to its opposite position, it is held in that position by the action of winding 45 of the relay. When the tongue of the relay is in the position illustrated, it completes a circuit through the winding 37 to ground through the conductor 46. At the same time conductor 46 is joined to one side of the winding 45 grounding that side of the winding. The other side of the winding 45 at that time is grounded through reset key 47 which is normally held against its upper contact 48. It is provided also with a lower contact 49. When an unbalance of the windings 31 and 32 causes the tongue of the relay to engage contact 44, the circuit through the winding 37 is ungrounded at this point and the current through this winding must traverse the winding 45 to ground through the reset key 47. In order that the flux of the winding 45 might at this time become greater than that due to winding 37 for holding the tongue in its operating position, a shunt resistance 51 is connected between lead 38 and the lower side of the winding 45 to pass additional current through the coil to the ground. This condition prevails, holding the tongue 42 against contact 44, until the reset key 47 is operated. When this is operated, the circuit through winding 45 is open and a conductor leading from contact 49 grounds the lower side of the winding 37 between it and the resistance 41 providing a relatively large flux which is sufficient to return the tongue of the relay to its normal position in engagement with contact 43.

The indicator or alarm mechanism is actuated when the tongue 42 of the comparison relay engages the contact 44. This provides a shunt ground circuit through conductor 52. As illustrated the indicator or alarm mechanism comprises a clock 53 or other suitable time recording device in series with a suitable indicator lamp 54 and a buzzer or ringer alarm 55. The devices illustrated are merely typical and any other indicator or recording device may be employed. The devices are supplied with current from a suitable source such as the lines of the sixty cycle A. C. power source. One side of this circuit is preferably grounded as illustrated by the ground 56, which grounds the conductor 57 leading to one side of the clock 53. The other power conductor 58 connects the clock in series with the alarm devices 54 and 55 and leads from the alarm devices to the other side of the line. The clock is of the type having a relatively high resistance and passes normally an insufficient current to operate either the lamp 54 or the alarm 55. In this manner so long as the conductor 52 is ungrounded, the clock is operated to measure time in the ordinary manner. However, as soon as the latter conductor is grounded by the operation of the comparison relay 29 in the manner described, the portion of the circuit including the clock will be shunted out of the alarm circuit removing the resistance of the clock and enabling sufficient current to pass to operate the alarm and light the lamp.

For testing a relay or a complete circuit, the apparatus as illustrated in Fig. 1, operates in substantially the following manner. Impulses from the sixty cycle source operate the sending relay 10 to produce signal impulses which are transmitted to the circuit 17 in substantially the same manner as if ordinary traffic signals were being sent. If it is decided to test the life or reliability of the relay only, or in other words the length of time the relay will continue to operate before the strength of any one of the reproduced signals drops below a certain point, the conductor 22 will be connected to the test apparatus through the switch 25, the same being thrown into its left-hand position. On the other hand, if the whole circuit is to be tested, the switch 25 is shifted to its right-hand position connecting the test apparatus to the tongue of the preceding terminal relay 19 therethrough to the circuit 17. At the same time the test impulses are set up in relay 10 which are opposed by pulses produced in the winding 32. Likewise, the current of the vacuum tube 26 is simultaneously excited from the signal circuit with current potentials of a strength directly proportionate to the strength of the pulses reproduced by the apparatus being tested. These pulses are amplified through the vacuum tube arrangement to produce current pulsations in the winding 31 which are substantially equal to those in the winding 32 when the strength of the reproduced signals is at a normal maximum. If the strength of any one of the reproduced signals falls below the predetermined normal maximum, the pulse of the winding 31 will not be equal in strength to that produced in the winding 32 and a resultant flux or kick will be produced in the relay 29. When this resultant kick is sufficient to overcome the bia. of the winding 37, the tongue 42 of the relay will be moved to the other of its rest positions. When this occurs the tongue will be held or locked in the other rest position substantially as described. At the same time, the clock circuit will be shunted out causing the clock to stop and indicate the time at which the failure occurred. Simultaneously, the signal lamp and buzzer will be operated to call the attention of the attendant that a failure has occurred.

By suitably adjusting the bias of the winding 37 various tests may be made on the apparatus which will indicate when a failure of a predetermined amount or degree has occurred. In this manner the circuit may be tested for failures, say of 10%, 25%, 50% or more, and the life or reliable continuity of the apparatus may be determined for certain degrees or percentages of normal maximum operation of the devices.

It should be noted that with the above apparatus arranged for a loop circuit test, failures in the reproduced signal are recorded which may be due either to poor circuit continuity or fortuitous distortion or any other circumstance which reduces the reproduced signal strength or causes phase shift resulting in an unbalance of the comparison relay. In other words any condition arising which causes the operation of a signal circuit or apparatus to deviate from normal will be recorded by the indicators of the test device.

The locking feature of the comparison relay may be omitted, and a counter or other continuous recording device substituted for the clock in the alarm circuit which will record the number or frequency of recurring failures.

Referring to Fig. 2, another embodiment of this invention is illustrated which is likewise arranged to respond to or observe every signal traversing the test circuit or apparatus. The arrangement comprises primarily a test relay coupled to a circuit which may be an actual circuit preferably of the loop form or an artificial circuit simulating actual conditions. In addition the arrangement comprises the test apparatus suitably connected to the circuit or contact device to be tested. The device or apparatus to be tested comprises the arrangement substantially as shown in Fig. 1 which includes a relay 10 upon which the original signal is impressed. The relay embodies an energizing coil 11 in circuit with a conductor 12 over which the signals arrive. The relay employed is the usual polar relay including a tongue 14 vibrating between contacts 15 and 16. The contacts are supplied respectively with minus and plus battery and the tongue 14 is connected to the artificial line 17 which includes receiving relays 18 and 19 connected to form a duplex circuit arrangement. A conductor 22 taps the line between the tongue of the relay 10 and artificial circuit for connecting the test apparatus at a point to indicate the action of the relay 10 when working into a load circuit. A similar conductor 24 is arranged to connect the tongue of the relay 19 with the test apparatus to indicate the overall operation of the relay and circuit combination. Although a duplex circuit is illustrated in any other suitable circuit or any other apparatus it may be arranged for test in a similar manner.

The apparatus for testing the circuit comprises a pair of cylindrical distributors 61 and 62 or commutators arranged to be rotated in synchronism. The distributors are preferably mounted upon a single shaft 63 which is driven by a Morkrum type motor 64 or any similar constant speed motor which may be suitably controlled such as by a tuning fork arranged to drive the motor on a phonic principle.

The distributor 61 is divided into two segments 65 and 66 which are insulated from each other and provided with means for supplying minus and plus battery respectively. Distributor sector 65 is supplied with minus battery through the ring 67 mounted upon the shaft and suitably connected to the sector through conductor 68. Brush 69 rides upon this ring and has a conductor 70 joined thereto which leads to the current supply. The other sector 66 is supplied with plus battery through ring 71 connected thereto through conductor 72. Brush 73 rides upon this ring and has conductor 74 joined thereto and leading to source of positive current. If desired a changeover switch 75 may be included in the circuit of conductors 70 and 74 for reversing the polarity of that current supply to the respective segments of the distributor.

As the distributor 61 rotates in a counterclockwise direction, signal current is supplied alternately of a negative and positive value to the energizing coil of the polar relay 10 through a brush 76 riding on the distributor and through the conductor 12. In this manner the relay is energized positively and negatively with the full value of battery applied thereto for each half revolution or half cycle. This impresses a signal of substantially square top form upon the relay and test apparatus of any frequency which may be chosen, by operating the motor 64 at a suitable speed. This arrangement provides the means for impressing a continuous signal of a constant known frequency upon apparatus to be tested and provides a means for making a life continuity test of the apparatus in response to a definite and known type of signal. On the other hand, the test signal is not limited to one frequency. It may be changed to different frequencies by merely changing the speed of the drive motor 64.

However, the function of the continuity indicating portion of the apparatus as will be presently described does not depend upon the employment of the signal generating apparatus just described. The regular traffic signals may be impressed upon the apparatus or signals of any other desired character.

The distributor 62 provides the nucleus of an arrangement which will observe or respond to indicate when at any selected point in the cycle of impressed signal the strength of the reproduced signal falls below the value required to operate a reproducing or receiving relay. The apparatus cooperating with the distributor 62 comprises a receiving relay 79 and an alarm or recording relay 80. The receiving relay 79 is energized by a winding 81. Means comprising a switch 82 is provided for connecting the winding 81 in circuit with the tap conductor 22 for observing the continuity of the circuit through relay 10 alone. In another position the switch 82 connects with the tap conductor 24 for observing the continuity of the entire test circuit including the reproducing relay 19 and any other intermediate repeating apparatus which may be included therein. The relay 79 is of a polar type and is provided with an armature 83 which vibrates between contacts 84 and 85.

The alarm relay 80 is also preferably a polar relay embodying an operating winding 86 and a biasing winding 87. The relay is arranged as will be more fully described so that when current is traversing both of the windings, the alarm and timing mechanism is operated to render an indication substantially as described in connection with the alarm mechanism of Fig. 1. When current is prevented from traversing the operating winding 86 the relay is restored to a position to render the alarm mechanism inoperative.

The distributor 62 is arranged so that in cooperating with the receiving relay 79 the winding 86 of the alarm relay is short circuited as long as the response of the receiving relay is normal or follows within a certain phase deviation from normal as determined by the setting of the apparatus associated with the distributor. The distributor 62 is divided into insulated sectors 88 and 89 disposed opposite each other. Between the ends of the sectors 88 and 89 are small segments 90 and 91 insulated from the sectors. The sectors occupy a major portion of the circumference of the distributor while the segments are relatively short and preferably of a length corresponding to the travel time of the relay tongue 83 in moving from one contact to the other. The relay tongue is connected to both of the sectors 88 and 89 through a brush 92 riding upon a ring 93 located on the shaft 63. The ring is connected by means of a conductor 94 to both of the sectors 88 and 89.

The contacts 84 and 85 of the receiving relay are connected respectively to the segments 90 and 91 through a similar brush and ring arrangement. The contact 84 is connected through brush 94 and ring 95 through a jumper lead to the segment 90. Likewise, the contact 85 is connected through another brush 96, ring 97, and jumper lead to the segment 91. Current to the distributor is supplied from the conductor 100 connected through blocking resistance 113 to a suitable source of plus battery. The upper portion of the conductor 100 forms a part of the short circuit around the operating winding 86 of the alarm relay 80. The short circuit is completed from the commutator through a brush 98 and a return conductor 99. The brush 98 is mounted so that it may be rotated to drag on the face of the commutator at different angular positions. The brush is connected to a suitable means for moving the same, such as dial 104 arranged to indicate the position of the brush with relation to the phase angle of the signal input current derived from the signal from the commutator 61.

If a current were supplied to all portions of the periphery of the commutator 62 at all times, the short circuit through the conductors 100 and 99 would always remain complete. However, current is supplied to the segments 90 and 91 only through the tongue 83 of the receiving relay when in engagement of the relay contacts 84 and 85. Since the tongue is in engagement with only one of the contacts at a time the segment connected to the contact against which the tongue is resting is supplied with current while the other segment is neutral or dead. The relation of the segments and brush 98 is such that for normal operation of the receiving relay, in other words when the received signal is substantially in phase with the original signal, the tongue 83 will have moved into engagement with the contact connected to whichever segment is approaching the brush 98 just prior to the passage of the sector underneath the brush. So long as this takes place in the proper phase relation, current is supplied always to the brush 98 and the short circuit remains complete. However, if the received signals should lag or fail, the tongue 83 would not be in engagement with the approaching segment when it passed underneath the brush 98, and at that instant the short circuit would be opened.

The alarm relay and a circuit for connecting it to the alarm mechanism together with the method of operating it by reason of the short circuit becoming opened, will now be described.

The alarm relay 80 provided with a tongue or armature 101 contacts 102 and 103 between which the tongue 101 moves. The bias winding 87 holds the tongue 101 normally against contact 102. A blocking resistance 105 limits the current from the plus battery source. The other end of the winding is grounded at 106. The tongue is moved to the contact 103 by means of the energizing winding 86 which is supplied with current from positive battery through conductor 108. This winding is grounded at 106 through reset switch 109. As already described, the winding 86 is normally short circuited through the recording relay 79 and commutator device 62. When open circuit condition occurs through the commutator short circuit current is shunted through this winding causing it to overcome the effect of the bias winding 87 and move the tongue 101 over to contact 103 where it completes an operating circuit for the alarm or indicator mechanism. The tongue 101 is also grounded through the reset switch 109.

The alarm mechanism may be similar to that described in connection with Fig. 1, comprising a synchronous motor clock 53, a signal lamp 54 and a buzzer 55. The alarm mechanism is preferably supplied with 60 cycle current from a suitable source, one side of said line being grounded and the other side providing a circuit through the lamp and buzzer arranged in parallel, these being arranged in series with the clock the circuit being completed through ground 106. Normally, the clock in the circuit provides a sufficiently high resistance to prevent the operation of the lamp and buzzer. When the tongue 101 grounds contact 103 it completes a short circuit through conductor 111 around the clock 53, stopping the same and providing a direct circuit to the ground for the lamp and alarm which permit them to draw sufficient current to operate them.

The operation of the observing indicating portion of the system, including the commutator arrangement 62 of the signal reproducing relay 81 and alarm relay 80 is substantially as follows. The signals reproduced in relay 79 cause the tongue 83 to move back and forth between contacts 84 and 85, the conductor 100 being connected in circuit with the tongue 83 and also brush 92 provides different paths for completing the circuit through the brush 98. When the brush is in contact with either the sector 88 or 89 the circuit is completed through the brush 92 and ring 93 which are connected to both sectors. When the brush 98 is in contact with segment 90 the circuit must be completed through the tongue 83, contact 84 through the brush 94 and ring 95. On the other hand when the brush 98 is in contact with the segment 91 the circuit must be completed through brush 96 and ring 97. In this manner with the commutator rotating in a counterclockwise direction, assuming that the brush 98 is first in contact with sector 88, the short circuit will be completed through the brush 92 without including any part of the relay 79. As soon as the segment 90 moves into contact with the brush 98 the circuit path will be through brush 94 and contact 84. The circuit will be closed only if an incoming signal has moved tongue 83 over against contact 84. This will take place as soon as the sector 66 of the signal generating commutator 61 has moved in the contact with brush 76. The response of the relay 79 in moving its tongue 84 will lag behind the action of the commutator 61 an amount determined by the characteristics of the signal apparatus, such as delay in the response of the relays, the line, and various intermediate apparatus when the line is being tested. This phase difference will determine whether the brush 98 in the position shown will engage segment 90 in a live or dead condition. The brush may be shifted backward and forward so that when segment 90 arrives under the brush tongue 83 will have reached contact 84. It should be noted that when the test apparatus is in operation a segment (90 or 91) will pass under the brush corresponding to each current impulse in the signal being received.

The apparatus provides for signal failures to be observed at different phase angles by making a series of tests setting the phase brush 98 in each test at a different angle. Suppose for instance the brush were set at 45° out of phase to the original signal. At this setting all reproduced signals which are less than 45° out of phase will have moved the tongue 83 of the receiving relay into engagement with the proper contact to establish the circuit to the approaching segment 90 or 91, as the case may be, before the segment reaches the brush 98, thus maintaining the continuity of the short circuit through conductors 100 and 99 undisturbed. On the other hand, whenever the arrival of any one of the reproduced signals is greater than 45° out of phase, the circuit to the approaching segment corresponding to that signal pulse will not be established. This is because the tongue 83 will not have arrived at the contact. The segment will therefore be dead, permitting open circuit to occur between the conductors 100 and 99 as the brush 98 passes over the segment. The open circuit between conductors 100 and 99 removes the short circuit from the winding 86 causing the current to pass to the ground therethrough. The arrangement is such that this overcomes the bias of the winding 87 and moves the tongue 101 into engagement with the contact 103. This sets off the alarm mechanism substantially in the manner described in connection with Fig. 2. The alarm mechanism may be restored to normal by opening the resetting switch 109 whereupon the observations may be continued until a succeeding failure occurs.

If it is desired to automatically record the number of failures occurring during a definite period of time, the alarm mechanism may be arranged to restore itself and a counter or similar device inserted in a suitable portion of the circuit to register the number of times open circuit condition occurs between the short circuit leads 100 and 99. Such a counter may be inserted in the lead 108 as illustrated.

The embodiment just described may be employed for testing a long circuit extending between two distant points. In such a case the signal forming distributor 61 is not employed. The signals are originated at the sending end either as traffic or test signals. The test apparatus is located at the receiving end and the relay 79 energized by or in conjunction with the receiving or reproducing relay. The distributor is kept in step by driving or controlling the motor 64 phonetically as by a fork kept in synchronism with the original signals. In this manner the apparatus may be employed as effectively for testing a long circuit as a single relay or a loop circuit.

From the foregoing description it will be seen that the embodiment of Fig. 2 provides means for observing not merely certain degrees or percentages of failure in the signal apparatus but also the phase distortion or in what relation the reproduced signal is received with respect to the original. By suitably setting the phase indicating brush, it may be observed whether the failures occur in the initial portion of the signal wave pulses or at the end thereof. Also, it may be observed whether the reproduced signal is received with substantially the same wave form as the original. The ability to observe the behaviour of the reproduced signal with respect to the phase of the original will make it possible to ascertain whether so-called fortuitous distortion is merely a phase disturbance of the signal or whether it is of such nature as to counteract or combine with the reproduced signal to substantially blot it out. Various other uses of the apparatus will occur to persons skilled in the art.

On the whole it will be observed that means have been provided according to this invention for observing each signal traversing the apparatus being tested. This means that the actual number of failures occurring in a circuit may be ascertained and not merely an average number of failures as with the arrangements heretofore provided for observing only a small portion of signals such as one in every ten. It will also be observed that the test apparatus provides means for comparing the received signal with the original in a definite and accurate manner and that the observations do not have to be reckoned from some assumed comparison point. On the other hand, the actual reproduced signal is compared with a known standard making it necessary only to record the result of this comparison in order to obtain an accurate picture of the conditions of operation.

While this invention has been described in but two forms it will be obvious to those skilled in the art that it is not so limited but may be embodied in various other forms and modifications without departing from the spirit thereof, and it is desired therefore that only such limitations shall be placed thereon as are imposed by the prior art or set forth in the appended claims.

What I claim is:

1. In a mechanism for testing electrical signal reproducing apparatus, means for impressing upon said apparatus original signals to be reproduced thereby, said mechanism including a comparison device having a pair of windings arranged to act in opposition to each other, means associated with said device responsive to the resultant flux of said windings for rendering an indication, means for forming a bleeder circuit for connecting the reproduced signal circuit to one of said opposed windings, means for impressing the original signals upon the other of said windings, means in the bleeder circuit for amplifying the bled portion of a normally reproduced signal to substantially the level of the original signals as impressed upon the comparison device, and means for shaping the wave form of the amplified signal to conform substantially with the original signal as impressed upon the comparison device, whereby an indication will be rendered when any reproduced signal falls below the relative strength of the original.

2. In a mechanism for testing electrical signal reproducing apparatus, means for impressing upon said apparatus original signals to be reproduced thereby, said mechanism including a comparison device having a pair of windings arranged to act in opposition to each other, means associating with said device responsive to the resultant flux of said windings for rendering an indication, means for connecting the reproduced signal circuit to one of said opposed windings and means for impressing the original signals upon the other of said windings, and means in said connecting circuit for shaping the wave form of the reproduced signals to conform substantially with the original signals as impressed upon the comparison device, whereby an indication will be rendered when the reproduced signal wave form of any signal varies with respect to the wave form of the original.

3. In a device for testing signal repeating apparatus, means to impress a signal of a predetermined frequency upon the apparatus to be tested, an indicating circuit for the repeated signals and means to impress each signal as repeated upon said circuit, means in said circuit conditioned in synchronism with the impressed signals for indicating when the comparative strength of the signal received falls below a predetermined relative value.

4. In a device for testing signal repeating apparatus, the combination of means for impressing a signal of predetermined frequency upon the apparatus to be tested, an indicator circuit, means for impressing each of the reproduced signals upon said indicator circuit and means in said indicator circuit operating in phase with the portion of the impressed signals occurring in a predetermined portion of their cycle for indicating when said predetermined portion of the signal cycle falls below a certain strength.

5. In a device for testing signal repeating apparatus, means for impressing signal impulses of a definite character upon the apparatus, a comparison relay having a first winding energized from the impressed signal, a second winding disposed to act in opposition to the first winding and being energized from the reproduced signal, and an armature for said relay having a rest position and an indicating position, said relay being biased toward the rest position and arranged to be moved to the indicating position by the differential flux generated when the strength of the reproduced signal fails to energize the second winding of said relay to such an extent as to prevent the first winding from overcoming the second winding together with said armature bias.

6. In a device for testing signal repeating apparatus, means for impressing signal impulses of a definite character upon the apparatus, a comparison relay having a first winding energized from the impressed signal, a second winding disposed to act in opposition to the first winding and being energized from the reproduced signal, and an armature for said relay having a rest position and an indicating position, said relay being biased toward the rest position and arranged to be moved to the indicating position by the differential flux generated when the strength of the reproduced signal fails to energize the second winding of said relay to such an extent as to prevent the first winding from overcoming the second winding together with said armature bias, and means to hold the armature in indicating position until manually released.

7. In a device for testing signal repeating apparatus, the combination of first and second synchronously rotated distributors having respectively sectors corresponding to each signal pulse, means for rotating said distributors, means for supplying current of opposite polarity to adjacent sectors of the first distributor, brush means for collecting and impressing said opposite currents alternately upon the apparatus to be tested to produce signal pulses of alternating polarity, means cooperating with the second distributor for completing a circuit through the sectors thereof successively in a predetermined phase relation to the signal pulses impressed upon the apparatus to be tested by the sectors of said first distributor, and means to condition a circuit for rendering an indication when the phase of any reproduced signal is lagging behind the circuit completions through said sectors of the second distributor.

8. In a device for testing signal repeating apparatus, the combination of first and second synchronously rotating distributors, means for rotating said distributors, means to supply currents of opposite polarity to said first distributor, said distributor being arranged to impress said opposite currents alternately at a predetermined frequency upon the apparatus to be tested, means actuated by the reproduced signals for conditioning, in accordance with the signal arrival, a circuit to said second distributor, means for rendering an indication when said latter circuit is conditioned by a signal arriving by a phase different with respect to the original signal greater than a predetermined amount.

9. In a device for testing signal repeating apparatus, the combination of first and second synchronously rotated distributors each divided into sectors corresponding to signal pulses, means for rotating the distributors, means for supplying current of opposite polarity to adjacent sectors of the first distributor, a circuit embodying a brush coupled with the apparatus to be tested for collecting and impressing said opposite currents alternately upon said apparatus, means actuated by the reproduced signals for conditioning the circuit to said second distributor in accordance with the phase of the arrival of said reproduced signals with respect to the original impressed upon the apparatus to be tested, said means embodying a brush cooperating with said second distributor for completing a circuit through the sectors thereof, said brush being shiftable in its phase relation to the currents impressed by the said first distributor for rendering an indication when said signal is distorted by arriving at a phase different with respect to the original signal greater than the amount determined by the relative angular position of the first and second brushes with respect to their normal (in phase) position.

GEORGE L. ERICKSON.